J. B. FOOTE.
MOTOR DRIVEN VEHICLE
APPLICATION FILED AUG. 25, 1917, RENEWED APR. 5, 1921.

1,382,280.

Patented June 21, 1921.
7 SHEETS—SHEET 3.

Fig. 3.

Witness:
John Enders

Inventor:
John B. Foote
by Fred Gerlach
his Atty.

UNITED STATES PATENT OFFICE.

JOHN B. FOOTE, OF OAK PARK, ILLINOIS.

MOTOR-DRIVEN VEHICLE.

1,382,280.  Specification of Letters Patent.  Patented June 21, 1921.

Application filed August 25, 1917, Serial No. 188,091. Renewed April 5, 1921. Serial No. 458,760.

*To all whom it may concern:*

Be it known that I, JOHN B. FOOTE, a citizen of the United States, and a resident of Oak Park, in the county of Cook and State of Illinois, have invented certain new and useful Improvements in Motor-Driven Vehicles, of which the following is a full, clear, and exact description.

The invention relates to motor-driven vehicles.

One object of the invention is to provide an improved supporting structure in which the casing containing the transmission gearing is utilized as a supporting unit. Other objects will appear from the detail description of the structure exemplifying the invention.

The invention consists in the several novel features hereinafter set forth and more particularly defined by claims at the conclusion hereof.

In the drawings: Fig. 2 is a plan. Fig. 2ª is a detail of one of the planetary reducing gearings between the differential and a traction wheel.

The improved tractor comprises a pair of rear traction-wheels 15 and a pair of dirigible front wheels 16. The front-wheels are mounted on knuckles 18, each of which is pivotally mounted in the forked end 19 on the front axle 20.

Figures 7, 8, 9:
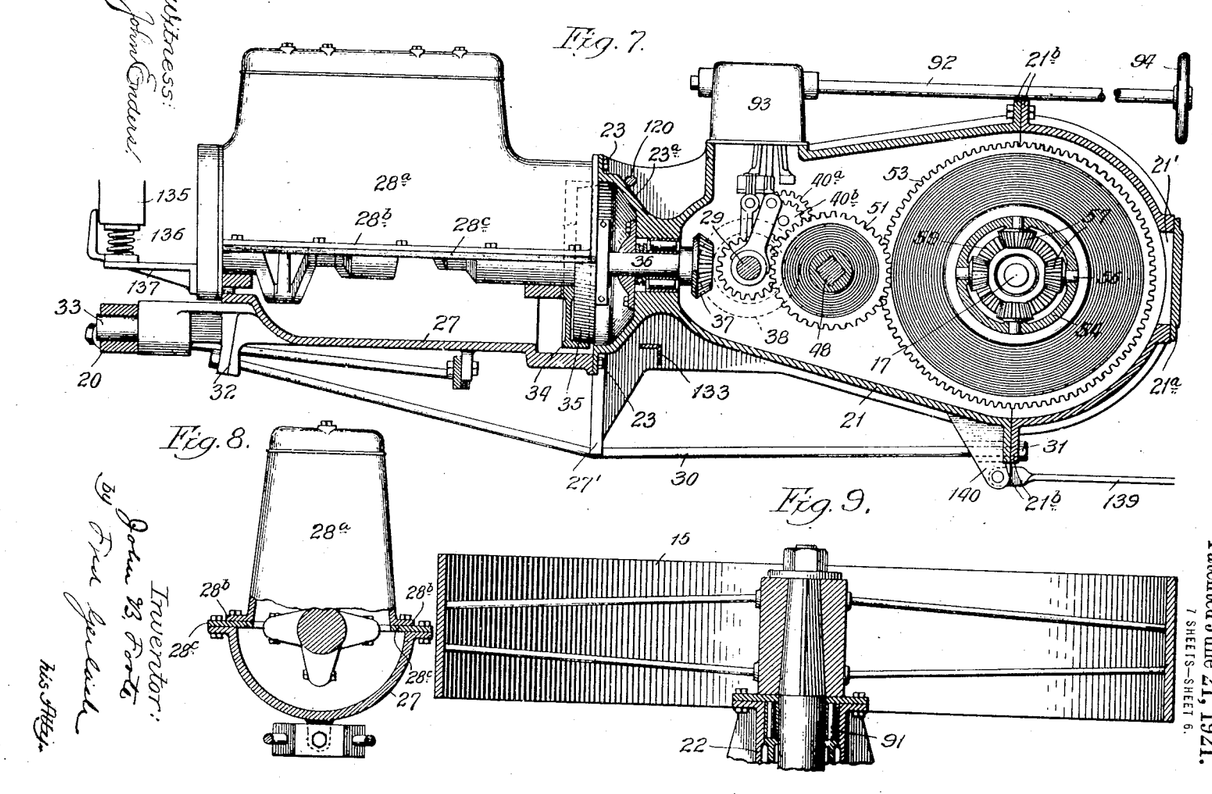
Fig. 7 is a vertical longitudinal section through the gear and crank-casings.
Fig. 8 is a detail showing the pivotal connection between the crank-casing and the braces for the front axle.
Fig. 9 is a detail of a modified form of connection between the axle and a traction wheel.

The supporting structure or frame between the front axle and the rear traction wheels comprises a combined transmission and differential gear housing or case 21 which is provided with axle housings or sleeves 22, having bearing portions 24 at their outer ends which are supported in roller bearings 25 in the hubs 26 of the traction wheels and a crank case 27 of a motor 28. The rear portion of the case 21 serves as a housing for the differential gearing and the front portion thereof serves as a housing for the transmission gearing and as a support for a service shaft 29. The front portion of housing 21 is bolted to the rear end of the crank-case, as at 23, and also serves as a clutch housing. The front end of the transmission gear-case is flared or enlarged, as at 23ª, to provide for a direct attachment to the crank case 27 and to the cylinder-casing of the motor 28 (Fig. 7). This construction is one which adapts the transmission gear case for direct attachment to the crank case and the cylinder casing of the motor. The central portion of this structure is reinforced by strut-lugs 27' which engage truss-rods 30, which are secured in the rear portion of gear-case 21, as at 31 and in lugs 32 depending from the front of the crank-case 27. The front end of the supporting structure is sustained by the front axle 20 through a stud 33 which is on and extends forwardly from the crank-case 27 into a bearing in said axle. This pivot permits the front, rear axles to tilt laterally and relatively to each other, so they can follow inequalities of ground or road.

The cylinder-casing 28ª of the motor 28 is provided with base-flanges 28ᵇ and is supported by a crank-case 27 through plates or templets 28ᶜ. The flanges 28ᵇ of casing 28ª are bolted to plates 28ᶜ and the latter in turn are bolted through flanges at the top of the crank-case 27. In the construction of tractors, it is desirable that the supporting structure should be standardized and adapted for different motors. By employing plates 28ᶜ between the cylinder casing and the crank-case, and bolting each separately to the plates, it is only necessary to specially form the intermediate plates for securement to the motor casing and to the crank case. For example, if a motor casing smaller than that shown in Fig. 8 is to be employed, plates suitably formed and drilled to receive bolts therefrom will serve as a connection with the crank-case shown, thus avoiding any modification of the crank-case in the use of different sized motors.

The crank case 27 exemplifies a supporting structure which extends between the gear-case and the front axle, on which the motor with its cylinder casing is secured, so it may be removed while the structure remains connected to the front axle and to the gear-case. This structure performs its supporting function independently of its use as a case for the cranks of the motor and may obviously be used as such a support without being used as such an inclosure, since if desired the motor may be provided with an additional member to inclose crank. The truss-rods 30 exemplifying-members of this supporting structure which are secured to the gear-case rearwardly of the joint between the cylinder-casing and the gear-case and transmit supporting stresses to the gear case rearwardly of its front end.

The shaft of motor 28 operates a fly-wheel 34, which serves as the driving-member of a clutch comprising a driven member 35 (Fig. 7). Member 35 is adapted to drive a short longitudinal shaft 36 (Figs. 6 and 7) which is mounted in the front of the gear case. A beveled gear wheel 37 on the rear end of said shaft meshes with a beveled gear 38 to drive a transverse drive-shaft 29 of the transmission gearing. A low-speed pinion 39 and an intermediate-speed pinion 40 are slidably mounted on shaft 29 and are constantly driven thereby. A high-speed pinion 41 is slidably mounted and rotatable on the hub of gear 38 and clutch-teeth 42 between pinion 41 and gear 38 are adapted to operate the pinion directly from said gear. Shaft 29 has one end mounted in a bearing 43 in a head 44 which is removably secured to one side of the gear-case 21. The other end of shaft 29 is mounted in a bearing 45 in a head or sleeve 46, which is removably secured to the other side of the gear case 21. A service pulley 47 is secured to the outer end of the drive-shaft 29. A shaft 48 mounted in bearings 49 has fixed thereon, a gear 50 which meshes with and is adapted to be driven by the high-speed pinion 41; a gear 51 with which the low-speed pinion 39 is adapted to mesh, and a gear 52 with which the intermediate-speed pinion 40 is adapted to mesh. Reverse pinions 40$^a$ and 40$^b$ (Fig. 7) are adapted to be shifted into mesh with pinion and gear 52 respectively to reverse the direction of travel of the tractor.

The construction and operation of these reverse pinions, as well as the transmission gearing in its entirety and the controlling mechanism therefor may be of the same construction set forth in an application filed by me July 16, 1917, Serial No. 180,750, to which reference may be had for a more detailed explanation. A shaft 92, which is slidable and rotatable in a housing 93 on top of the gear-casing 21, and a hand-wheel 94 secured to the rear end of said shaft, as more fully set forth in said application, control the transmission gearing so that the tractor may be driven either at high, low or intermediate speed or in reverse direction at one speed. This mechanism exemplifies variable speed and reversible transmisssion gearing contained in a case which is utilized as a part of the supporting structure.

A gear-ring 53 meshing with the gear 52 is adapted to drive the differential gearing contained in the case 21. This differential gearing comprises a drum 54 having removable sides 55. Radial arbors 56 are mounted in this drum and carries a pinion 57, which meshes with a gear 58 for driving one of the axles 17 and at its other side with a gear 59 for driving the other axle 17. The hubs of the gears 58 and 59 are mounted in bearings 59' formed in gear-members 60 which are secured in the sides of casing 21. Drum-sides 55 are mounted on the outside of bearings 59'. The outer end of each gear 58 and 59 is provided with an integral pinion 61. An armed collar 62 is fixed on the inner end of each of the axles 17 and carries studs 63 on which are mounted a series of planetary pinions 64. Each series of these pinions meshes with an internally toothed gear-ring 65 formed on one of the members 60. A driving-member 66 is fixedly secured by a nut 67 to the end of each of the axles 17. Each member 66 is rigidly secured to chordal bars 69, the outer ends of which are secured to the rim of a traction-wheel. The usual spokes 70 connect the rim and the hub 26 of each traction wheel. The chordal bars 69 serve as direct thrust or driving members between the drive plates 66 and the rims of the traction-wheels.

Figure 6:
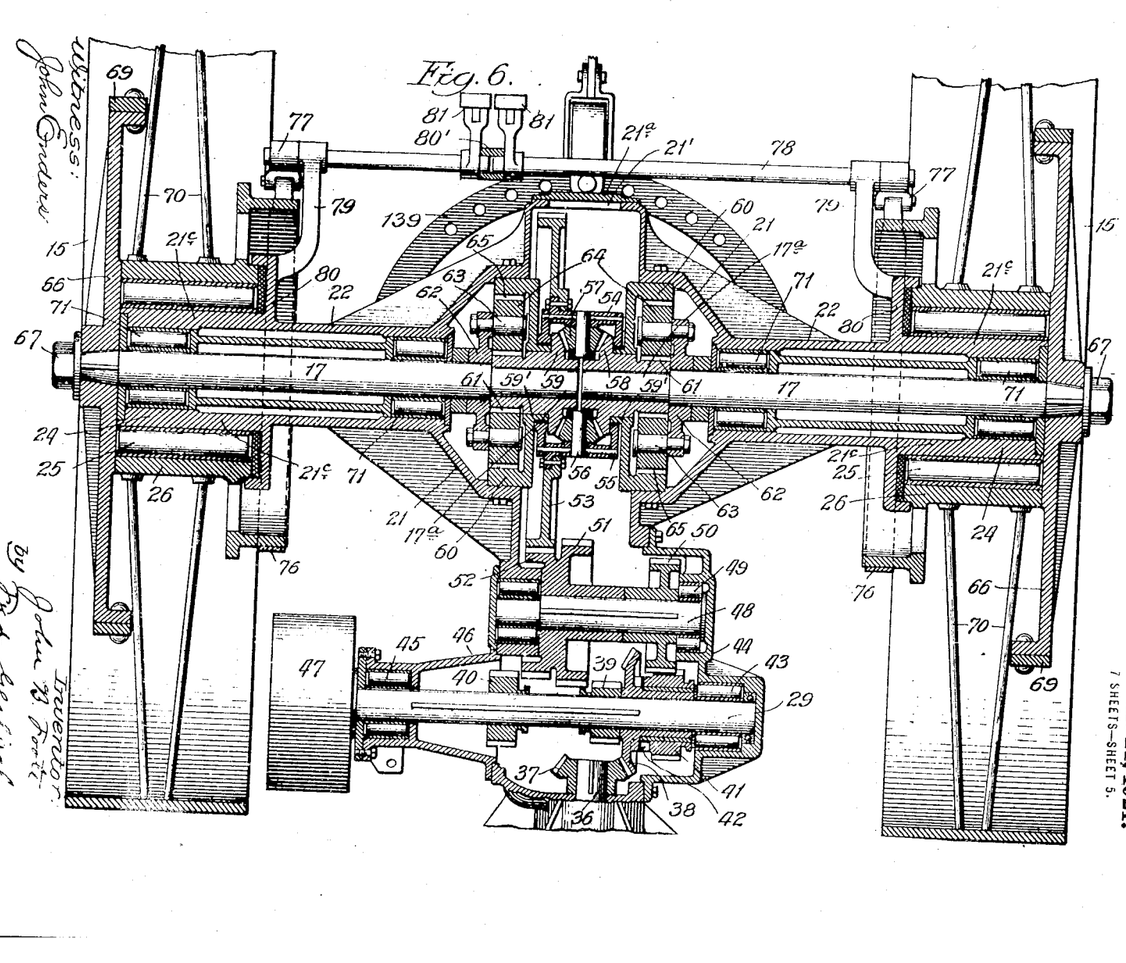
Fig. 6 is a horizontal section through the axis of the traction wheels.
Figure 10:
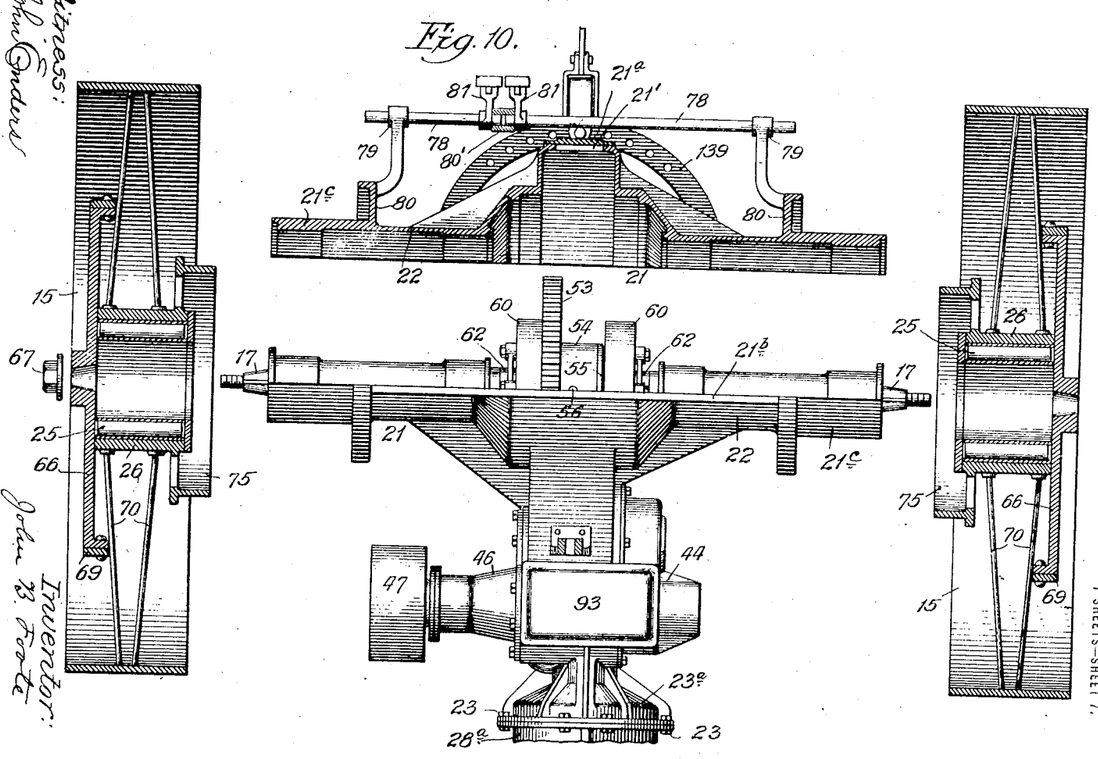
Fig. 10 is a view, partly in plan and partly in section of the transmission gearing and traction wheels, the parts being shown separated to illustrate their construction.

In the form of the invention illustrated in Fig. 6, the axles are of the full floating type and each is mounted in roller bearings 71 at the inner and outer ends of the sleeve 22. For convenience in assembling the differential and the planetary gearing, the case 21 and sleeves 22 are sectionally formed and divided longitudinally, as shown in Fig. 10. For access to the differential drum, the back of the case 21 is provided with an opening 21' which is closed by a removable cap 21$^a$. The sections of the case 21 and sleeves 22 are formed with flanges 21$^b$ at the top and bottom thereof which are rigidly secured together by bolts and reinforce the case vertically. The end-portions 21$^c$ of the sections of the case 21 and sleeves 22 are adapted to extend into the hubs of the traction-wheels respectively so that they will be supported directly by the traction wheels. The inner ends 17$^a$ of the axles are extended into the beveled gears 58 and 59 respectively.

In operation, rotation of the gear 53 will rotate the drum 54 responsively to the variable speed and reversible transmission gearing, and the differential-pinions 57 will operate the gear wheels 58 and 59 conjointly or differentially, as well understood in the art. This operation will drive the pinions 61 which engage the planetary pinions 64. The latter engaging the stationary gear-rings 65, will move around the pinions 61, so that the axles 17, which are rotated by the planetary pinions, will be driven at a reduced speed with respect to the differential gears 58 and 59.

This construction exemplifies one in which planetary gearing is used between the differential and the traction wheels for speed reduction; in which planetary gearing is mounted on or around the inner ends of the axles; and in which the planetary gearing is applied to a full floating axle. This construction also exemplifies one in which the differential gearing and the speed reduction gearing between the differential and the traction-wheels are conjointly inclosed in a gear case or housing. Also one in which the case is extended to inclose the variable speed and reversible transmission gearing through which the differential gearing is driven.

A modification is illustrated in Fig. 9 in which the hub of the traction wheel is secured directly to the outer end of the axle. In this form of the invention, the gear-case and its sleeves are sustained on the axle, being provided with roller bearings 91 which bear on the axles.

The steering mechanism for the front wheels comprises a controller-wheel 82, a shaft-section 83, to which said wheel is fixed, and shaft-sections 84 and 85, all of the shaft-sections being connected by universal joints 86, a worm 87 on the shaft-section 85, and a gear 88 fixed to one of the steering knuckles 18 and is disposed within one of the forked ends of the front axle. The two front wheels 16 are cross-connected by arms 89 on the knuckles 18 respectively and a connecting rod 90 between said arms. Shaft-sections 84 and 85 are mounted in lugs 110 and 111 formed on the crank case and shaft section 83 is supported in a lug 112 on the gear-case 21.

Figure 1:
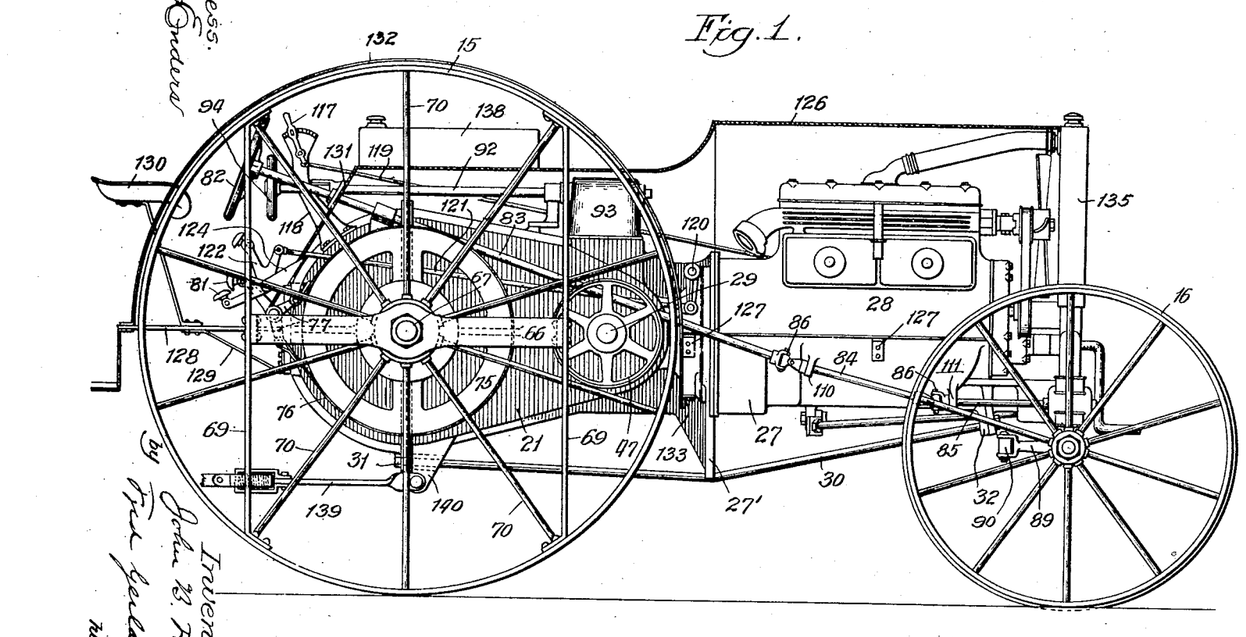
Figure 1 is a side elevation of a tractor embodying the invention, the hood being shown in section.
Figures 2, 2A:
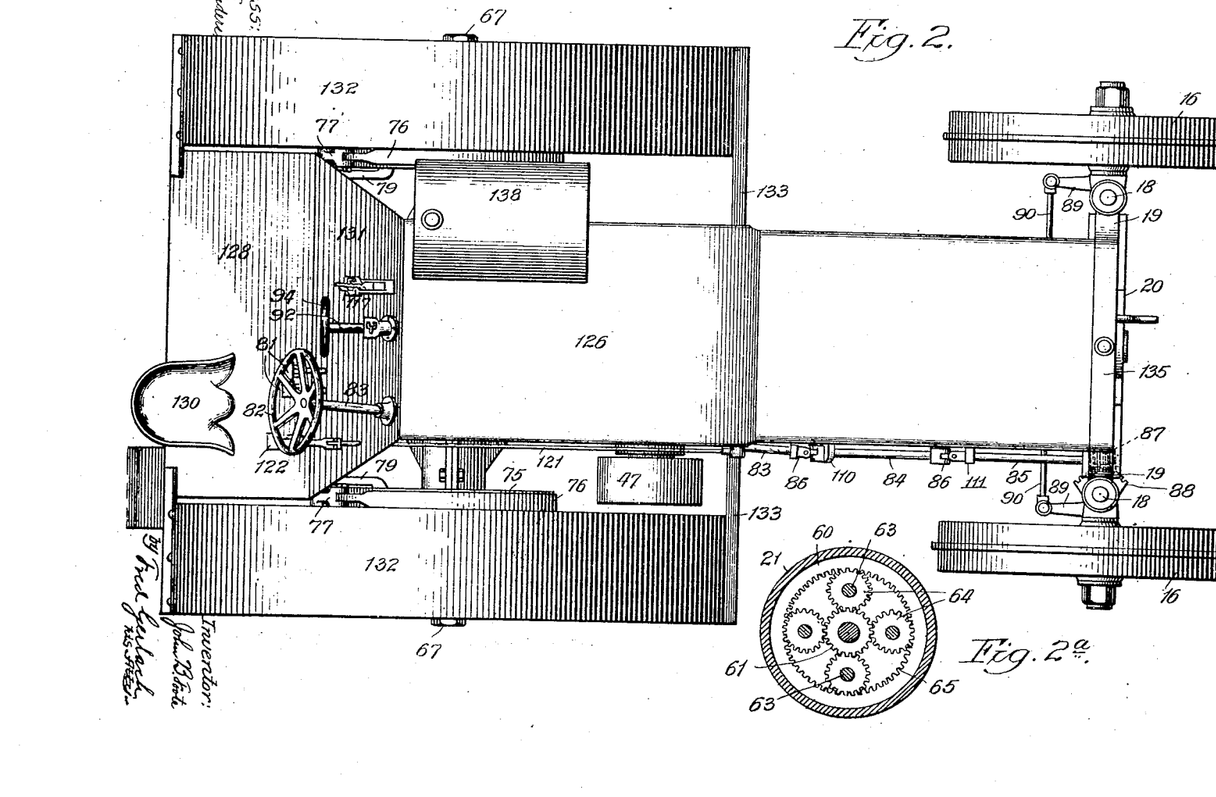
Figure 3:
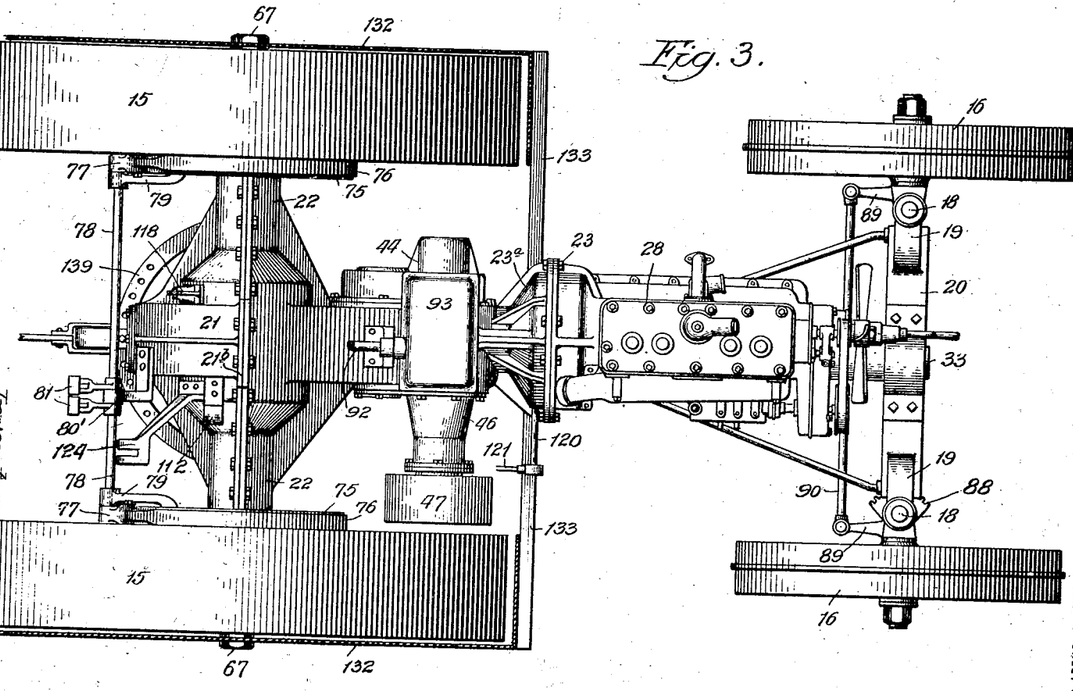
Fig. 3 is a plan, the hood and parts being removed.
Figure 4:
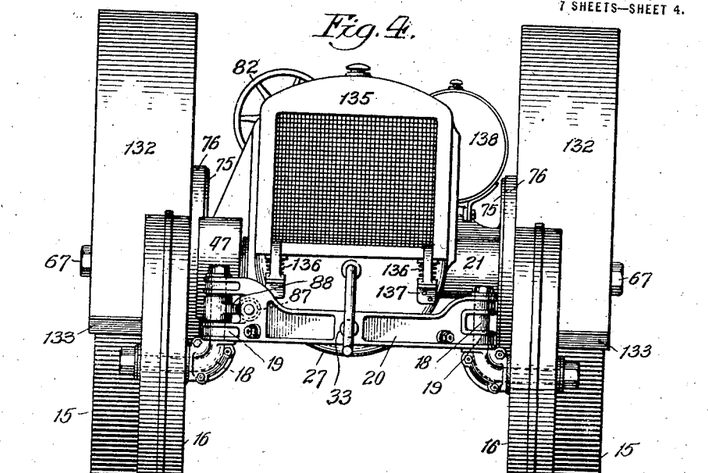
Fig. 4 is a front elevation.
Figure 5:
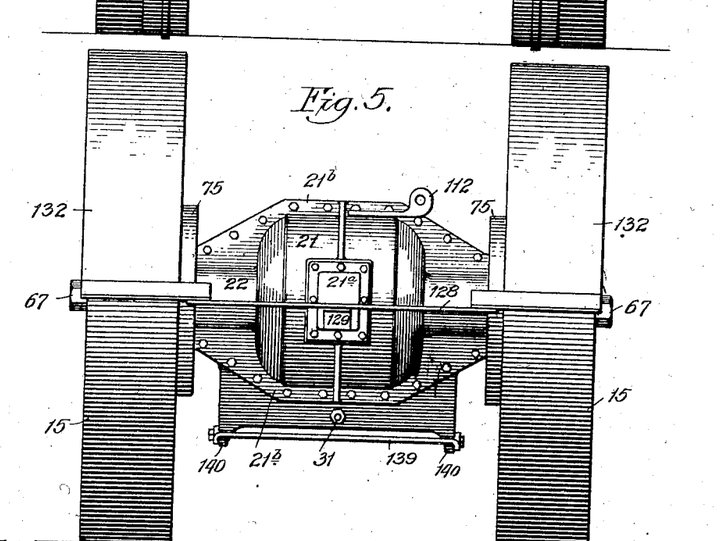
Fig. 5 is a rear elevation, parts being omitted.

A brake-drum 75 is formed on each traction-wheel hub 26 (Fig. 10). A brake-band (Figs. 1, 3 and 6) is suitably hung around each drum 75. These brake-bands are operable by levers 77 which are fixed to shafts 78 respectively. Each shaft 78 is held in a lug 79 integrally formed with a flange 80 on one of the sleeves 22 and in a bracket 80' which is secured to the case 21. Foot levers 81 are connected to operate shaft 78 and are arranged together so that the operator can apply foot pressure to either or both, to apply both of the brake-bands 76 simultaneously or to apply either band independently in steering the vehicle.

A throttle-controlled lever 117 is mounted in a bracket 118 which is bolted to the gear-case 21 and is connected by a rod 119 to the throttle of the motor in any suitable manner, as well understood in the art.

The clutch-member 35 is adapted to be shifted into and out of operative position by a rock shaft 120 which is mounted in the transmission case, a rod 121 which is connected to an arm in said rock-shaft and to a foot lever 122. This foot lever is mounted in a bracket 124 which is secured to the gear-case 21.

A hood 126 for covering the motor and gear-case is supported by brackets 127 secured to the crank-case 27 and the gear case 21. The hood comprises an inclined back wall 131 adjacent which all of the controlling mechanisms are disposed within convenient reach of the operator upon the seat 130. A driver's platform 128 is supported by braces 129 which are secured to the rear section of the gear case 21. The driver's seat 130 is supported on this platform. Wheel fenders 132 are secured to bars 133 which are secured to lugs on the gear case 21 and also to the platform 128.

A radiator 135, connected to the motor to receive cooling liquid therefrom and return it thereto, is yieldingly supported by springs 136 which are held on the brackets 137 which are secured to the front of the crank-case 27. By yieldingly supporting the radiator, it is relieved from severe jarring when the tractor is traveling over rough soil. A fuel tank 138 is sustained on the hood 126. A curved bar 139 has its front ends pivotally connected to lugs 140 which depend from the front section of the gear-case 21 and is adapted to receive any suitable draft connection for pulling a plow or other implement or load.

The invention exemplifies a tractor in which the crank-case and a gear casing containing the variable speed transmission and differential gearing are utilized as a supporting structure between the carrying wheels, to dispense with a special frame. Also one in which the speed reducing mechanism between the differential and the traction-wheels is mounted around the axle and is inclosed. Also one in which the speed reducing mechanism between the differential and the traction wheels is disposed at the inner ends of the axles. Also one in which substantially all of the controlling mechanisms are supported from the gear-case and crank-case.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In a tractor, the combination of front and rear axles, one of which is driven and the other of which is tiltable, a motor, transmission gearing driven by the motor, and connected to drive the driven axle, a case for said gearing inclosing the driven axle, and a supporting structure separate from the gear-case on which the motor is supported, having one of its ends extended to and supported by the tiltable axle and its other end rigidly secured to the other end of said case, said motor being separate and removable from said structure without disconnecting the structure from the case.

2. In a tractor, the combination of front and rear axles, a motor and casing therefor, transmission gearing driven by the motor and connected to drive one axle, a case for said gearing extended to inclose the driven axle and a supporting structure separate from the gear case, having one of its ends extended to and supported by the other axle and its other end rigidly secured to the other end of the gear case, said motor being secured to said structure, formed to abut against and secured to the latter end of the gear case, and removable from the structure without disconnecting the structure from the case.

3. In a tractor, the combination of front and rear axles, one of which is driven, a motor, transmission gearing driven by the motor and connected to drive the driven axle, a case for said gearing inclosing the driven axle, and a supporting structure on which the motor is supported, separate from the gear case extending between the other axle and said gear-case and comprising a member secured to the gear case rearwardly of the motor, said motor being separate from said structure and removable therefrom without disconnecting said member from the gear-case.

4. In a tractor, the combination of rear driven axles, a front axle, a motor with a casing, transmission gearing driven by said motor and connected to drive the rear axle, a case inclosing said gearing and extending around the rear axle and forwardly to the motor casing, said motor-casing having one of its ends secured to the front end of the gear-case, and a supporting structure separate from the gear-case and extending between the front axle and the gear-case and comprising a member secured to the gear-case rearwardly of the motor casing, the motor being removable without disconnecting the structure from the gear-case.

5. In a motor vehicle, the combination of a pair of co-axial traction wheels, steering wheels, axles for the traction-wheels respectively, a motor-casing, variable-speed transmission gearing driven by the motor, differential gearing driven by the transmission gearing, reducing gearing between the differential and the inner ends of the axles, a case for said transmission and differential gearing extended into and supported by the traction wheels, and rigid with the motor-casing, said casing and gearing case forming a primary supporting and longitudinal connecting structure between the steering and traction wheels.

6. In a motor vehicle, the combination of traction and steering wheels, a motor, variable speed transmission gearing driven by the motor and for driving a traction-wheel, a case for said transmission gearing having sleeves extended into the hubs of the traction-wheels, and a crank-case rigid with the gear-case, said crank-case and gear-case forming a supporting and longitudinal connecting structure between the steering and traction wheels.

7. In a motor vehicle, the combination of traction and steering wheels, a motor, variable speed transmission gearing driven by the motor and for driving a traction wheel, a sectional case for said transmission gearing having sleeves extended into the hubs of the traction-wheels, and a crank-case rigid with the gear-case, said crank-case and gear-case having a supporting and longitudinal connecting structure between the steering and traction wheels.

8. In a motor vehicle, the combination of traction and steering wheels, a motor comprising a casing, variable-speed transmission gearing driven by the motor, a case inclosing said transmission gearing, extended rearwardly to and supported by the traction wheels, said motor case and gear case forming a primary supporting and longitudinal connecting structure between the steering and traction wheels, and a brace rod secured to the rear of the case and to the front of the casing for reinforcing said structure.

9. In a motor vehicle, the combination of traction and steering wheels, a crank case, a motor mounted on the crank-case, variable-speed transmission gearing driven by the motor, a case inclosing said transmission gearing extended rearwardly to the traction wheels, said crank case and gearing forming a primary supporting and longitudinal connecting structure between the steering and traction wheels and a brace-rod secured adjacent the rear of the gear case and the front of the crank-case and engaging said structure medially.

10. In a motor vehicle, the combination of traction and steering wheels, a motor comprising a casing, variable speed-transmission gearing driven by the motor, a case inclosing said transmission gearing, a front axle, a pivotal connection between the motor casing and the front axle which permits the axle to swing vertically, brace-rods secured to the outer ends of the axle and a laterally extending member pivoted to the motor casing and to which said rods are secured.

11. In a motor vehicle, the combination of traction and steering wheels, a motor comprising a casing, variable speed transmission gearing, a case inclosing said transmission gearing, a longitudinal shaft mounted in one end of said gear-case, connected to drive the transmission gearing, and adapted to be driven by the motor, the case being enlarged around said shaft and secured to one end of the motor casing and a bearing for the shaft adjacent said end of the gear-case.

12. In a motor vehicle, the combination of traction and steering wheels, a motor for driving the vehicle comprising a cylinder-casing, a separate crank-case, a separate member interposed between the cylinder-casing and the crank-case, to which both said case and said casing are secured, and transmission-gearing between the motor and the traction-wheels.

13. In a motor vehicle, the combination of traction and steering wheels, a motor for driving the vehicle comprising a cylinder casing, a separate crank-case, a plate interposed between the cylinder-casing and the crank-case, to which said case and said casing are secured, and transmission gearing between the motor and the traction-wheels.

14. In a motor vehicle, the combination of traction and steering wheels, a motor, variable-speed transmission gearing driven by the motor, a case for said gearing, brakes for the traction wheels respectively, and brake-applying means comprising a pair of foot levers, separately operable connections between the foot levers and the brakes respectively, said levers being disposed together so that they may be conjointly or separately operated, the connections and levers being supported from the gear case.

15. In a motor vehicle, the combination of traction and steering wheels, a motor, variable-speed transmission gearing driven by the motor, brakes for the traction-wheels respectively, and brake-applying means comprising a pair of foot levers, a divided cross-shaft between the foot levers and the brakes, said levers being disposed together so that they may be conjointly or separately operated.

JOHN B. FOOTE.